(12) United States Patent
Kagaya et al.

(10) Patent No.: US 8,020,772 B2
(45) Date of Patent: Sep. 20, 2011

(54) NONCONTACT DATA RECEIVER/TRANSMITER

(75) Inventors: Hitoshi Kagaya, Minato-ku (JP); Yoshiaki Ide, Minato-ku (JP); Takeshi Yamakami, Yokohama (JP); Kenji Ebihara, Ama-gun (JP); Shutaro Wake, Inazawa (JP)

(73) Assignees: Toppan Forms Co., Ltd., Tokyo (JP); Aica Kogyo Company, Limited, Kiyosu-shi (JP)

( * ) Notice: Subject to any disclaimer, the term of this patent is extended or adjusted under 35 U.S.C. 154(b) by 310 days.

(21) Appl. No.: 11/720,299

(22) PCT Filed: Dec. 12, 2005

(86) PCT No.: PCT/JP2005/022782
§ 371 (c)(1),
(2), (4) Date: Nov. 15, 2007

(87) PCT Pub. No.: WO2006/067989
PCT Pub. Date: Jun. 29, 2006

(65) Prior Publication Data
US 2008/0191028 A1 Aug. 14, 2008

(30) Foreign Application Priority Data
Dec. 20, 2004 (JP) ................................. 2004-368091

(51) Int. Cl.
*G06K 5/00* (2006.01)
*G06K 19/06* (2006.01)
*G06K 7/08* (2006.01)
(52) U.S. Cl. ......... 235/492; 235/380; 235/449; 235/493
(58) Field of Classification Search ................. 235/492, 235/497, 487, 493, 449, 380; 343/895, 702, 343/788; 340/572.5, 572.6, 571.1; 428/928; 242/372
See application file for complete search history.

(56) References Cited

U.S. PATENT DOCUMENTS

| | | | | | |
|---|---|---|---|---|---|
| 5,515,059 | A | * | 5/1996 | How et al. | 342/372 |
| 5,912,622 | A | * | 6/1999 | Endo et al. | 340/572.5 |
| 6,146,773 | A | * | 11/2000 | Kaule | 235/493 |
| 6,186,398 | B1 | * | 2/2001 | Kato et al. | 235/449 |

(Continued)

FOREIGN PATENT DOCUMENTS

EP 1 484 816 A1 12/2004

(Continued)

OTHER PUBLICATIONS

Nobuyuki Teraura, "Development and Application of RF Tag-Future of Wireless IC Chip", First Edition, CMC Publishing Co., Ltd., p. 121, 2003. (with partial English translation).

(Continued)

*Primary Examiner* — Thien Mai
(74) *Attorney, Agent, or Firm* — Oblon, Spivak, McClelland, Maier & Neustadt, L.L.P.

(57) ABSTRACT

A non-contact type data reception and transmission body has an inlet having a base substrate, and an antenna and an integrated circuit chip which are provided on one side surface of the base substrate, and connected to each other, and a magnetic substrate layer disposed so that the magnetic substrate layer covers at least one of the antenna and the integrated circuit chip which constitute the inlet, wherein the magnetic substrate layer has a main component of a resin including a filler made of magnetic microparticles.

14 Claims, 3 Drawing Sheets

U.S. PATENT DOCUMENTS

| | | | |
|---|---|---|---|
| 6,229,444 B1 * | 5/2001 | Endo et al. | 340/572.6 |
| 6,371,380 B1 * | 4/2002 | Tanimura | 235/492 |
| 6,861,731 B2 | 3/2005 | Buijsman et al. | |
| 6,917,526 B2 | 7/2005 | Ajioka et al. | |
| 7,088,304 B2 * | 8/2006 | Endo et al. | 343/788 |
| 7,161,542 B2 * | 1/2007 | Endo et al. | 343/702 |
| 7,192,628 B2 * | 3/2007 | Burrows | 235/449 |
| 7,315,248 B2 * | 1/2008 | Egbert | 235/492 |
| 7,336,221 B2 | 2/2008 | Matsuo et al. | |
| 7,405,709 B2 | 7/2008 | Takahashi et al. | |
| 7,451,934 B2 * | 11/2008 | Takahashi et al. | 235/492 |
| 2002/0056758 A1 * | 5/2002 | Stenzel et al. | 235/493 |
| 2003/0117336 A1 | 6/2003 | Droz | |
| 2003/0179151 A1 | 9/2003 | Senba et al. | |
| 2003/0190498 A1 * | 10/2003 | Fujieda et al. | 428/928 |
| 2005/0007296 A1 * | 1/2005 | Endo et al. | 343/895 |
| 2007/0095913 A1 | 5/2007 | Takahashi et al. | |
| 2007/0252771 A1 | 11/2007 | Maezawa et al. | |
| 2008/0042266 A1 | 2/2008 | Kagaya et al. | |
| 2008/0191028 A1 * | 8/2008 | Kagaya et al. | 235/492 |

FOREIGN PATENT DOCUMENTS

| | | |
|---|---|---|
| JP | 4-27599 | 1/1992 |
| JP | 5-30874 | 2/1993 |
| JP | 5-30874 | 4/1993 |
| JP | 6-344692 | 12/1994 |
| JP | 7-306264 | 11/1995 |
| JP | 9-12954 | 1/1997 |
| JP | 10-162260 | 6/1998 |
| JP | 10 261516 | 9/1998 |
| JP | 11-16756 | 1/1999 |
| JP | 11016756 A * | 1/1999 |
| JP | 11-45317 | 2/1999 |
| JP | 11-216627 A | 8/1999 |
| JP | 11-348110 A | 12/1999 |
| JP | 11-352243 A | 12/1999 |
| JP | 2000-90637 | 3/2000 |
| JP | 2000-113142 | 4/2000 |
| JP | 2000-148947 | 5/2000 |
| JP | 2000-276565 | 10/2000 |
| JP | 2000 311226 | 11/2000 |
| JP | 2000-331135 | 11/2000 |
| JP | 2001 291816 | 10/2001 |
| JP | 2001-312709 | 11/2001 |
| JP | 2002-132153 A | 5/2002 |
| JP | 2002-208876 A | 7/2002 |
| JP | 2002-232321 A | 8/2002 |
| JP | 2002 271127 | 9/2002 |
| JP | 2002-290131 | 10/2002 |
| JP | 2002-298095 | 10/2002 |
| JP | 2002-298116 | 10/2002 |
| JP | 2002-324221 | 11/2002 |
| JP | 2002-325013 | 11/2002 |
| JP | 2003-22912 | 1/2003 |
| JP | 2003-36431 | 2/2003 |
| JP | 2003-68775 | 3/2003 |
| JP | 2003-99747 | 4/2003 |
| JP | 2003 108966 | 4/2003 |
| JP | 2003-519424 A | 6/2003 |
| JP | 2003 317052 | 11/2003 |
| JP | 2003-331243 | 11/2003 |
| JP | 2004-47701 | 2/2004 |
| JP | 2004-54337 | 2/2004 |
| JP | 2004-94522 | 3/2004 |
| JP | 2004-355192 | 12/2004 |
| JP | 2005-11227 | 1/2005 |
| JP | 2005-327939 | 11/2005 |
| WO | WO 01/80173 A1 | 10/2001 |
| WO | WO 0250951 A1 * | 6/2002 |
| WO | WO 03030300 A1 * | 4/2003 |
| WO | 2006 041033 | 4/2006 |

OTHER PUBLICATIONS

Japanese Office Action issued Nov. 30, 2010, in Patent Application No. 2005-124865 (with English-language translation).
Japanese Office Action issued Nov. 30, 2010, in Patent Application No. 2005-121896 (with English-language translation).
Japanese Office Action issued Nov. 30, 2010, in Patent Application No. 2005-121897 (with English-language translation).
Japanese Office Action issued Feb. 1, 2011, in Patent Application No. 2005-121896 (with English language translation).
Japanese Office Action issued Feb. 1, 2011, in Patent Application No. 2005-121897 (with English language translation).
Japanese Office Action issued Feb. 1, 2011, in Patent Application No. 2005-124865 (with English language translation).
U.S. Office Action mailed Feb. 14, 2011, in the U.S. Appl. No. 11/576,162.

* cited by examiner

BACKGROUND ART

BACKGROUND ART

NONCONTACT DATA RECEIVER/TRANSMITER

BACKGROUND OF THE INVENTION

1. Field of the Invention

The present invention relates to a non-contact type data reception and transmission body as an information recording media for RFID (Radio Frequency IDentification) use which can receive information from outside and transmit the information outside using electromagnetic waves as a medium.

This application claims priority of Japanese Patent Application No. 2004-368091, filed Dec. 20, 2004, the contents of which are incorporated herein by reference.

2. Description of the Related Art

In recent years, a non-contact type data reception and transmission body as an information recording media for RFID (Radio Frequency IDentification) use such as a non-contact IC (integrated circuit) tag, and the like has been proposed in which information can be received from the outside and can be transmitted to the outside using electromagnetic waves as a medium.

In an IC label, which is an example of the non-contact type data reception and transmission body, when the electromagnetic waves from a reader/writer are received, an electromotive force is generated at an antenna by resonance action, an IC chip within the IC label is booted by the electromotive force, information within the IC chip is converted to signals, and the signals are transmitted from the antenna of the IC label.

The signals transmitted from the IC label are received by the antenna of the reader/writer, and are transmitted to a data processing apparatus via a controller, and data processings such as identification, and the like are performed.

In order for the IC label to be operated, although the electromagnetic waves transmitted from the reader/writer are fully received by the antenna of the IC label, an electromotive force greater than the operation electromotive force of the IC chip must be induced, and when the IC label is attached on the surface of a metallic article, magnetic flux becomes parallel with respect to the metallic article at the surface of the metallic article. Therefore, a problem occurs in which, because the magnetic flux across the antenna of the IC label decreases, and the induced electromotive force decreases, the induced electromotive force is less than the operation electromotive force of the IC chip, and the IC chip does not operate (see for example, Non Patent Document 1: Supervision by Nobuyuki Teraura, "Development and Application of RF tag—Future of Wireless IC chip—", First edition, CMC Publishing Co., Ltd., Feb. 28, 2003, Page 121, FIG. 2)

FIG. 3 is a schematic view showing a flow of magnetic flux in the case in which an IC label is disposed on a surface of a metallic article. Because a magnetic flux 102 generated from a reader/writer 101 becomes parallel at the surface of a metallic article 103, the magnetic flux that passes through an antenna 105 of an IC label 104 disposed on the surface of the metallic article 103 decreases, and an electromotive force induced at the antenna 105 decreases, and thereby an IC chip 106 does not operate.

Then, in order for the IC chip to operate on the metallic article, a method is proposed in which the antenna is wound around a ferrite core, the ferrite core is disposed so that an axial center of the antenna becomes parallel with respect to a direction of the magnetic flux at the surface of the metallic article, the magnetic flux that passes through the surface of the antenna is increased, and thereby the induced electromotive force is increased (see for example, Patent Document 1: Japanese Unexamined Patent Application, First Publication No. 2003-317052).

FIG. 4 is a perspective view of an IC tag according to an embodiment of Patent Document 1, and in FIG. 4, an antenna 111 is wound around the circumference of a square-shaped ferrite core 115, and on a part where the antenna 111 is not wound, an IC chip 112, condenser 113, and the like are mounted on the ferrite core 115 via a base substrate 114.

When a plane surface part (undersurface in FIG. 4) of the square-shaped ferrite core 115 of the IC tag is attached to the surface of a metallic article, because the magnetic flux parallel to the surface of the metallic article passes through the ferrite core 115, since the magnetic flux passes perpendicularly through the inside of the antenna 111, a desired inductive voltage occurs, and the IC chip 112 operates.

On the other hand, there is a proposal in which the antenna is formed in a plane shape, the magnetic flux passes through a magnetic core member provided on the undersurface of the antenna, and thereby the magnetic flux passes through the inside of the antenna formed in the plane shape, an induced electromotive force is generated in the antenna, while a conductive member is provided on the undersurface of the magnetic core member, and thereby a deleterious influence on the IC label from the article on which the IC label is disposed is prevented (for example, Patent Document 2: Japanese Unexamined Patent Application, First Publication No. 2003-108966).

FIG. 5 is a cross-sectional view showing an embodiment of Patent Document 2. An antenna 121 for the IC label is made of a conductor 121a circinately wound within the plane surface, and is provided with a plate-shaped or sheet-shaped magnetic core member 123 adhered to a side surface of the antenna 121 for the IC label, and a conductive material portion 124 on the undersurface of the magnetic core member 123.

The magnetic core member 123 is laminated on another surface of the base substrate to which the antenna 121 for the IC label is provided so that, crossing a part of the antenna 121 for the IC label, one end portion of the magnetic core member 123 is positioned at the outside of the antenna 121 for the IC label, and another end portion of the magnetic core member 123 is positioned at the central portion (inside) of the antenna 121 for the IC label.

When the magnetic core member 123 is laminated as such, because the magnetic flux enters from one end portion of the magnetic core member 123, and leaves from another end portion, the magnetic flux that has left another end portion passes through the inside of the antenna 121 for the IC label, and thereby an electromotive force is induced in the antenna 121 for the IC label made of the conductor 121a. Therefore, even if the IC label is attached to the surface of an article 125, and the direction of the magnetic flux on the circumference of the IC label becomes parallel with respect to the surface of the antenna 121 for the IC label, the magnetic flux passes through the inside of the antenna 121 for the IC label. Therefore, because a voltage which is sufficient for operating the IC chip is induced, the IC chip reliably operates.

Furthermore, in the present embodiment, because the conductive member 124 is laminated and attached to another surface of the base substrate to which the antenna 121 for IC label is provided so that the magnetic core member 123 is covered, the conductive member 124 shuts off the passing of the radiowave for the article. Therefore, the antenna 121 for IC label is hardly affected by the article 125 regardless of whether the article 125 is a metal or not, and even if the surface of the article 125 is made of a metal, loss due to an eddy current generating on the metal surface, or the like does not occur, and the IC label reliably operates in the case in which the IC label is attached to the metallic article 125.

However, in Patent Document 1, a problem occurs in which, in order to increase the induced electromotive force, when a diameter of the antenna 111 is increased so that the magnetic flux passing through the antenna 111 is increased, the thickness of the IC label is increased.

On the other hand, in Patent Document 2, a problem occurs in which, because the magnetic core member and the conductive member are provided on one surface of the base substrate, the thickness of the IC label is increased.

SUMMARY OF THE INVENTION

The present invention is made in view of the above-mentioned circumstances, and aims to provide a non-contact type data reception and transmission body in which it is not necessary to increase the thickness of the non-contact type data reception and transmission body, and even if the non-contact type data reception and transmission body is in contact with an article including at least a metal, an electromotive force which fully exceeds the operational electromotive force of the IC chip can be induced and used.

The present invention is a non-contact type data reception and transmission body having: an inlet having a base substrate, and an antenna and an integrated circuit chip which are provided on one side surface of the base substrate, and connected to each other; and a magnetic substrate layer disposed so that the magnetic substrate layer covers at least one of the antenna and the integrated circuit chip which constitute the inlet, wherein the magnetic substrate layer has a main component of a resin including a filler made of magnetic microparticles.

In the non-contact type data reception and transmission body according to the above constitution, because the magnetic substrate layer is disposed so that the magnetic substrate layer covers at least one of the antenna and the IC chip which constitute the inlet, even if a magnetic flux comes in contact with an article including at least a metal, the magnetic flux is picked up by the antenna via the magnetic substrate layer, and thereby an induced electromotive force which is sufficient for operating the IC chip can be generated in the antenna. Moreover, when the magnetic substrate layer is formed so that the magnetic substrate layer covers at least the antenna and the IC chip, the magnetic substrate layer functions as a protective layer for the antenna and the IC chip.

In the non-contact type data reception and transmission body according to the above constitution, the average particle size of the magnetic microparticles may be not less than 3 μm and not more than 200 μm.

According to the above constitution, the magnetic microparticles constituting the magnetic substrate layer can form one magnetic body which is linked. Therefore, the relative magnetic permeability of the magnetic substrate layer becomes large, and the magnetic flux passing through the magnetic substrate layer increases, as a result, it becomes easy to generate an induced electromotive force in the antenna which is sufficient for operating the IC chip.

In the non-contact type data reception and transmission body according to the above constitution, the magnetic microparticles may have a flake-shaped.

According to the above constitution, when the non-contact type data reception and transmission body is seen from one surface side of the base substrate, at lease a part of many magnetic microparticles constituting the magnetic substrate layer are overlapped with each other, and one magnetic body which is linked can easily be formed, as a result, the magnetic flux can easily pass through the magnetic substrate layer, and the magnetic flux can easily be picked up by the antenna.

In the non-contact type data reception and transmission body according to the above constitution, the magnetic microparticles may be sendust.

According to the above constitution, compared with the case in which other magnetic microparticles are used, the magnetic flux can easily pass through the magnetic substrate layer, and the magnetic flux can easily be picked up by the antenna.

In the non-contact type data reception and transmission body according to the present invention, because the magnetic substrate layer is disposed so that the magnetic substrate layer covers at least one of the antenna and the IC chip which constitute the inlet, even if magnetic flux comes in contact with the article including at least a metal, an induced electromotive force which is sufficient for operating the IC chip can be generated in the antenna.

DETAILED DESCRIPTION OF THE INVENTION

Hereinafter, a non-contact type data reception and transmission body according to the present invention is explained in detail.

First Embodiment

Figure 1:
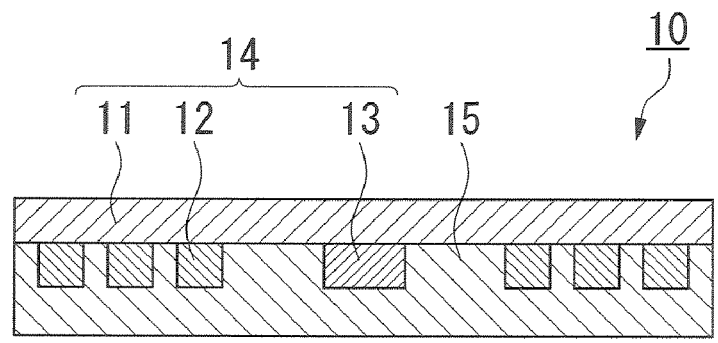
FIG. 1 is a schematic cross-sectional view showing a first embodiment of a non-contact type data reception and transmission body according to the present invention.

FIG. 1 is a schematic cross-sectional view showing a first embodiment of a non-contact type data reception and transmission body 10 according to the present invention.

The non-contact type data reception and transmission body 10 according to the present embodiment is schematically provided with a base substrate 11, an inlet 14 having an antenna 12 and IC chip 13 which are connected to each other, and a magnetic substrate layer 15 disposed so that the magnetic substrate layer 15 covers the antenna 12 and the IC chip 13. Moreover, the magnetic substrate layer 15 is constituted of a complex in which a filler made of at least magnetic microparticles is included in a resin.

In the non-contact type data reception and transmission body 10, the inlet 14 is provided on one surface of the base substrate 11, that is, the antenna 12 and the IC chip 13, which constitute the inlet 14, are not provided on both surfaces of the base substrate 11, and the antenna 12 and the IC chip 13 are provided on either one side surface thereof. Moreover, the antenna 12 is provided in a coil shape with a predetermined interval on one side surface of the base substrate 11.

Moreover, in the non-contact type data reception and transmission body 10, although the antenna 12 and the IC chip 13 are provided on the same surface (one side surface) of the base substrate 11, in the non-contact type data reception and transmission body 10 according to the present invention, a connection bridge forming a part of the antenna may be provided on an opposite surface (opposite surface with respect to the above-mentioned one side surface) with respect to the surface where the main part of the antenna 12 is provided.

Moreover, in the non-contact type data reception and transmission body 10, the antenna 12 and the IC chip 13, which constitute the inlet 14, are connected to each other, that is, the end portions of the antenna 12 are connected to both end terminals of the IC chip 13, respectively.

Furthermore, the complex composed of the filler made of the magnetic microparticles and the resin, which constitutes the magnetic substrate layer 15, covers the antenna 12 and the IC chip 13, that is, the complex covers the antenna 12 and the IC chip 13 to an extent in which the antenna 12 and the IC chip 13 are hidden. Furthermore, the magnetic substrate layer 15 may cover the antenna 12 and the IC chip 13 so that the surface (open surface) of the magnetic substrate layer 15 becomes flat.

Moreover, in the magnetic substrate layer 15, when viewing the non-contact type data reception and transmission body 10 from one side surface of the base substrate 11, at least a part of many magnetic microparticles constituting the magnetic substrate layer 15 are overlapped with each other, and one magnetic body which is linked is formed.

Moreover, the complex forming the magnetic substrate layer 15 is disposed in a space between the antenna 12 provided in a coil shape so that the complex is filled in the space, and a whole or a part of the magnetic microparticles constituting the complex are disposed in the space between the antenna 12.

As the base substrate 11, at least one of the below-described well-known materials is selected and used as at least a surface layer portion thereof. That is, the material which may be used as the base substrate 11 is a web made of an inorganic fiber such as a glass fiber, an alumina fiber, or the like, a nonwoven fabric, a mat, paper, or the like, or a combination of these materials, a web made of an organic fiber such as a polyester fiber, a polyamide fiber, or the like, a nonwoven fabric, a mat, paper, or the like, or a combination of these materials, or a complex substrate in which a resin varnish is impregnated with these materials, and molding is performed, a plastic substrate such as a polyamide system resin substrate, a polyester system resin substrate, a polyolefin system resin substrate, a polyimide system resin substrate, an ethylene-vinyl alcohol copolymer substrate, a polyvinyl alcohol system resin substrate, a polyvinylchloride system resin substrate, a polyvinylidenechloride system resin substrate, a polystyrene system resin substrate, a polycarbonate system resin substrate, an acrylonitrile butadiene styrene copolymerization system resin substrate, an acrylonitrile butadiene styrene copolymerization system resin, a polyethersulfone system resin substrate, or the like, or a material in which a surface processing is performed for these materials such as mat processing, corona discharge processing, plasma processing, ultraviolet-ray irradiation processing, electron irradiation processing, frame plasma processing, ozone processing, or various facilitative adhesion processings, or the like. An electric insulation of a film or sheet which is made of polyethylene terephthalate or polyimide is suitably used among them.

The antenna 12 is formed in which, using a polymer type electric conductive ink, a predetermined pattern is formed on one side surface of the base substrate 11 by screen printing, or a conductive foil is etched.

Illustrative of the polymer type electric conductive ink in the present invention is an ink illustrated in which electric conductive particulates are blended with the resin composition, for example, silver powder, gold powder, platinum powder, aluminium powder, palladium powder, rhodium powder, and carbon powder (carbon black, carbon nanotube, or the like).

If a heat-hardening type resin is used as the resin composition, the polymer type electric conductive ink becomes a heat-hardening type in which a coating forming the antenna 12 can be formed at a temperature of not more than 200° C., for example, at 100-150° C. A route where the electricity flows in the coating forming the antenna 12 is formed because the electric conductive particulates forming the coating are in contact with each other, and the value of resistance of the coating is in the order of $10^{-5}$ Ω·cm.

Moreover, as the polymer type electric conductive ink in the present invention, in place of the heat-hardening type, a well-known type is used such as an optical hardening type, osmosis dry type, solvent volatilization type, or the like.

In the optical hardening type of polymer type electric conductive ink, the optical hardening type resin is included in the resin composition, and because the hardening time is short, manufacturing efficiency can be improved. As the optical hardening type of polymer type electric conductive ink, for example, an ink is suitably used in which, with only a thermoplastic resin, or a blend resin composition (especially, a bridged resin due to polyester polyol and isocyanate, or the like) including a thermoplastic resin and bridged resin, not less than 60% by weight of electric conductive particulates are blended, and not less than 10% by weight of a polyester resin is blended, that is, an ink which is a solvent volatilization type or bridged/thermoplastic combination type (however, a thermoplastic type is not less than 50% by weight) is suitably used.

Moreover, when further bending characteristics are required in the antenna 12, flexibility enhancing agent can be blended with the polymer type electric conductive ink.

As the flexibility enhancing agent, for example, a polyester flexibility grant agent, an acrylic flexibility enhancing agent, a urethane flexibility enhancing agent, a polyvinylacetate flexibility enhancing agent, a thermoplastic-elastomer flexibility enhancing agent, a natural rubber flexibility enhancing agent, synthetic rubber flexibility enhancing agents, or a mixture including not less than two kinds of these flexibility enhancing agents may be used.

On the other hand, as the conductive foil which forms the antenna 12, copper foil, silver foil, gold foil, platinum foil, aluminium foil, or the like may be used.

The IC chip 13 is not especially limited, the IC chip 13 can be used in which writing and reading of the information can be performed in the non-contact state via the antenna 12, and any IC chip 13 which can be applied to RFID media such as a non-contact type IC card, non-contact type IC label, or non-contact type IC card, or the like can be used.

The complex forming the magnetic substrate layer 15 is composed of a filler made of magnetic particulates, and an organic resin made of a thermosetting compound or a thermoplastic compound, or an inorganic resin made of an inorganic compound.

The complex is, if necessary, used as follows, that is, in the formation of the paint including the additive agent or the solvent, the magnetic particulates are evenly dispersed by the processes of application and drying.

In the present invention, the average particle diameter of the magnetic particulates is not less than 3 μm and not more than 200 μm, preferably is not less than 5 μm and not more than 150 μm, and more preferably is not less than 5 μm and not more than 100 μm.

If the average particle diameter of the magnetic particulates is within the above-mentioned range, when viewing the non-contact type data reception and transmission body 10 from one side surface of the base substrate 11, at least a part of many magnetic particulates composing the magnetic substrate layer 15 are mutually overlapped, and form a connected magnetic body. Thereby, even if the non-contact type data reception and transmission body 10 is in contact with an article including at least a metal, because the magnetic flux is received by the antenna 12 through the magnetic substrate layer 15, induced electromotive force which is sufficient for the antenna 12 to operate the IC chip 13 can be generated. Moreover, if the average particle diameter of the magnetic particulates is within the above-mentioned range, in the case in which the antenna 12 is formed into the coil shape as in this embodiment, the magnetic particulates can be filled in the space between parts of the antenna 12. Thus, if the magnetic particulates are located the space between the parts of the antenna 12, the magnetic flux can more easily be received by the antenna 12.

In the case in which the average particle diameter of the magnetic particulates is below 3 μm, it is difficult for the magnetic particulates constituting the magnetic substrate layer 15 to form one connected magnetic body, and the relative magnetic permeability of the magnetic substrate layer 15 becomes small. That is, the magnetic flux passing through the magnetic substrate layer 15 becomes small, as a result, it becomes difficult to generate an induced electromotive force which is sufficient for the antenna 12 to operate the IC chip 13. On the other hand, when the average particle diameter of the magnetic particulates is over 200 μm, in the case in which the antenna 12 is formed as the coil shape, it becomes difficult for the magnetic particulates to be filled in the space between the parts of the antenna 12, and there is a possibility of short-circuiting the antenna 12.

Moreover, if the average particle diameter of the magnetic particulates is within the above-mentioned range, even if the particle diameter of the magnetic particulates forming the magnetic substrate layer 15 is varied, the non-contact type data reception and transmission body 10 of the present invention can fully operate.

Moreover, the amount of the magnetic particulates filled in the magnetic substrate layer 15, when the cohesion with the IC chip 13, or the like is considered, is preferably not less than 50% by weight and not more than 75% by weight, and further, is more preferably not less than 60% by weight and not more than 73% by weight. In the case in which the amount of the magnetic particulates filled in the magnetic substrate layer 15 is below 50% by weight, it is difficult for the magnetic particulates constituting the magnetic substrate layer 15 to form one connected magnetic body, and the relative magnetic permeability of the magnetic substrate layer 15 becomes small. That is, the magnetic flux passing through the magnetic substrate layer 15 becomes small, as a result, it becomes difficult to generate an induced electromotive force which is sufficient for the antenna 12 to operate the IC chip 13. Moreover, when the amount of the magnetic particulates filled in the magnetic substrate layer 15 is not less than 75% by weight, the communication distance of the non-contact type data reception and transmission body 10 is not significantly improved, and problems occur in which the cohesion with the IC chip 13, or the like decreases, and the strength of the magnetic layer is considerably decreased.

Moreover, regarding the shape of the magnetic particulates, various shapes such as spherical, disc-shaped, flake-shaped, needle-shaped, granular, and the like can be adopted. Among them, the flake-shaped is preferably used.

If the magnetic particulates are flake-shaped, when viewing the non-contact type data reception and transmission body 10 from one side surface of the base substrate 11, at least a part of many magnetic particulates composing the magnetic substrate layer 15 are mutually overlapped, and can easily form a connected magnetic body. Therefore, the magnetic flux can easily be received by the antenna through the magnetic substrate layer 15.

Furthermore, regarding the flake-shaped magnetic particulates, magnetic particulates with an aspect ratio (=average particle diameter/average thickness) of not less than 5 are preferable, and magnetic particulates with an aspect ratio of not less than 10 are more suitable. When the aspect ratio is below 5, it is difficult of the magnetic particulates to be connected to each other in the magnetic substrate layer 15, and the relative magnetic permeability of the magnetic substrate layer 15 becomes small. Furthermore, the average thickness of the flake-shaped magnetic particulates is preferably not less than 0.1 μm and not more than 3 μm, and is more preferably not less than 0.5 μm and not more than 1 μm.

Furthermore, regarding the type of material used for the magnetic particulates, for example, sendust (Fe—Si—Al alloy), carbonyl iron, permalloy (Fe—Ni alloy), silicon steel (Fe—Si alloy), Fe—Cr alloy, Fe—Co alloy, Fe—Cr—Al alloy, soft ferrite indicated by the general expression (Fe, "M")$_3$O$_4$("M" is a bivalent to pentavalent metal ion, Fe$^{2+}$, Mn$^{2+}$, Mn$^{3+}$, Ni$^{2+}$, Zn$^{2+}$, Co$^{2+}$, Co$^{3+}$, Cr$^{3+}$, Mo$^{4+}$, Mo$^{5+}$, Cu$^{2+}$, Mg$^{2+}$, Sn$^{2+}$, Sn$^{4+}$, Al$^{3+}$, V$^{3+}$, V$^{4+}$, V$^{5+}$, Sb$^{5+}$, Ti$^{4+}$, Si$^{4+}$, or the like), or the like may be used. Among them, flake-shaped sendust is preferable.

If the material used for the magnetic particulates is sendust, because the saturated magnetic flux density and magnetic permeability of the magnetic substrate layer 15 including sendust magnetic particulates as the component become high, the magnetic flux can more easily be received by the antenna 12 through the magnetic substrate layer 15. Furthermore, if the magnetic particulates are flake-shaped, when viewing the non-contact type data reception and transmission body 10 from one side surface of the base substrate 11, at least a part of many magnetic particulates composing the magnetic substrate layer 15 are mutually overlapped, and can easily form a connected magnetic body. Therefore, the magnetic flux can more easily be received by the antenna 12 through the magnetic substrate layer 15.

Moreover, if sendust is used as the magnetic particulates, the magnetic substrate layer 15 can be formed such that it is not easily corroded, flake-shaped manufacturing is easy, and the magnetic permeability is excellent; however, a material other than sendust can be used as the magnetic particulates constituting the magnetic substrate layer 15.

Moreover, as the magnetic particulates constituting the magnetic substrate layer 15, a plurality of mixed materials may be used.

Moreover, not all the magnetic particulates forming the magnetic substrate layer 15 need necessarily be either powdery or flake-shaped. In the magnetic substrate layer 15, the powdery magnetic particulates and flake-shaped magnetic particulates may be mixed, and even if differently shaped magnetic particulates are mixed, the non-contact type data reception and transmission body 10 according to the present invention has a sufficient effect.

As the resin constituting the complex which forms the magnetic substrate layer 15, a thermoplastic resin, thermosetting resin, reaction resin, or the like may be used, and among them, a suitable resin is selected in consideration of, in addition to miscibility, insulation, working efficiency, operating condition, and the like.

As the thermoplastic resin, a well-known thermoplastic resin is used such as, for example, vinyl chloride, vinyl acetate, vinyl acetate-ethylene copolymer, vinyl acetate-acrylic acid ester copolymer, vinyl chloride-vinylidene chloride copolymer, vinyl chloride-acrylonitrile copolymer, acrylic acid ester-acrylonitrile copolymer, acrylic acid ester-vinyl chloride-vinylidene chloride copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, poly fluoride vinyl, vinylidene chloride-acrylonitrile copolymer, acrylonitrile-butadiene copolymer, polyamide resin, polyvinyl butyral, cellulose derivative (cellulose acetate butyrate, cellulose diacetate, cellulose triacetate, cellulose propionate, or nitrocellulose), styrene butadiene copolymer, polyurethane resin, saturated polyester, or synthetic rubber material such as styrene rubber, fluorine rubber, silicon rubber, ethylene-propylene copolymer rubber, or the like. Moreover, two or more thermoplastic resins among them may be combined.

As the thermosetting resin or the reaction resin, for example, a well-known thermosetting resin or reaction type resin is used such as a phenol resin, epoxy resin, polyurethane setting type resin, urea resin, melamine resin, alkyd resin, silicone resin, amino resin, unsaturated polyester resin, or the like.

Moreover, as the additive agent included in the magnetic paint used for forming the complex constituting the magnetic substrate layer 15, a viscosity adjustment agent, defoaming agent, leveling agent, aseptic agent, dispersing agent, thickening agent, mixture agent, pigment, or the like is suitably used.

Moreover, as the solvent included in the magnetic paint, an organic solvent is used such as hexane, cyclohexane, methylcyclohexane, toluene, xylene, or ethylbenzene; an alcohol such as methanol, ethanol, butanol, isobutanol, propyl alcohol, isopropyl alcohol, or the like; a ketone such as cyclohexanone, methylcyclohexanone, methylethylketone, acetone, methylisobutylketone, diisobutylketone, isophorone, or the like; an ester such as ethyl acetate, butyl acetate, amyl acetate, cyclohexyl acetate, methyl acetoacetate, ethyl acetoacetate, dimethyl adipic acid, dimethyl glutamic acid, dimethyl succinic acid, or the like; an ether such as methyl ethyl ether, diethyl ether, butyl ethyl ether, dibutyl ether, or the like; an ethylene glycol derivative such as α-terpinol, ethylene glycol monomethyl ether, ethylene glycol monoethyl ether, ethylene glycol monobutyl ether, ethylene glycol dimethyl ether, ethylene glycol diethyl ether, ethylene glycol dibutyl ether, ethylene glycol monomethyl ether acetate, ethylene glycol monoethyl ether acetate, ethylene glycol monobutyl ether acetate, or the like; a diethylene glycol derivative such as diethylene glycol monomethyl ether, diethylene glycol monoethyl ether, diethylene glycol monobutyl ether, diethylene glycol dimethyl ether, diethylene glycol diethyl ether, diethylene glycol dibutyl ether, diethylene glycol monomethyl ether acetate, diethylene glycol monoethyl ether acetate, diethylene glycol monobuthyl ether acetate, or the like; and a propylene glycol derivative such as propylene glycol monomethyl ether, propylene glycol monoethyl ether, propylene glycol monobutyl ether, propylene glycol dimethyl ether, propylene glycol monomethyl ether acetate, or the like.

Thus, in the non-contact type data reception and transmission body 10 according to the present embodiment, because the magnetic substrate layer 15 is disposed so that the magnetic substrate layer 15 covers at least one of the antenna 12 and the IC chip 13, even if magnetic flux comes in contact with an article including at least a metal, an induced electromotive force which is sufficient for operating the IC chip 13 can be generated at the antenna 12. Moreover, when the magnetic substrate layer 15 is formed so that the magnetic substrate layer 15 covers at least the antenna 12 and the IC chip 13, the magnetic substrate layer 15 functions as a protective layer for the antenna 12 and the IC chip 13. In addition, in the present embodiment, although the antenna 12 which is formed in the coil shape on one side surface of the base substrate 11 is illustrated, the non-contact type data reception and transmission body 10 according to the present invention is not limited to this. In the non-contact type data reception and transmission body 10 according to the present invention, if an electromagnetic induction system or microwave radio-wave system is adopted, pole shape system, bending pole shape system, loop shape system, or the like may be adopted, or if an electromotive force can be obtained, differently shaped antennas, or the like may be employed.

Moreover, in the present embodiment, although the non-contact type data reception and transmission body 10 is illustrated in which the coil-shaped antenna 12 and the IC chip 13 are separately mounted on one side surface of the base substrate 11, and the antenna 12 and the IC chip 13 are connected to each other, the non-contact type data reception and transmission body 10 according to the present invention is not limited to this. In the non-contact type data reception and transmission body 10 according to the present invention, the IC chip 13 may be mounted on the antenna 12, or the antenna 12 may be formed on the IC chip 13.

Moreover, in the present embodiment, although the magnetic substrate layer 15 disposed so that the magnetic substrate layer 15 covers the antenna 12 and the IC chip 13 is illustrated, the non-contact type data reception and transmission body 10 according to the present invention is not limited to this. In the non-contact type data reception and transmission body 10 according to the present invention, the magnetic substrate layer 15 may be disposed so that the magnetic substrate layer 15 covers only the antenna 12 or only the IC chip 13. The case in which the magnetic substrate layer 15 is disposed so that the magnetic substrate layer 15 covers only the antenna 12 means that, for example, the antenna 12 is formed on the IC chip 13.

Next, with reference to FIG. 1, a manufacturing method of the non-contact type data reception and transmission body 10 according to the present embodiment is explained.

First, the antenna 12 which has a predetermined thickness and a predetermined pattern is provided on one side surface of the base substrate 11 (antenna formation process).

In the present process, when the antenna 12 is made of a polymer type electric conductive ink, after the polymer type electric conductive ink is printed on one side surface of the base substrate 11 at a predetermined thickness and with a predetermined pattern by a screen printing method, the polymer type electric conductive ink is dried and hardened, and thereby the antenna 12 is formed at a predetermined thickness and with a predetermined pattern.

Moreover, when the antenna 12 is formed by the conductive foil, the following procedures are performed.

After the conductive foil is adhered to a whole of one side surface of the base substrate 11 by a silk screen printing method, etching-proof paint is printed on the conductive foil with a predetermined pattern. After the etching-proof paint is dried and hardened, it is soaked in etching liquid, copper foil where the etching-proof paint is not painted is dissolved and removed, the area of copper foil where the etching-proof paint is painted remains on one side surface of the base substrate 11 and thereby the antenna 12 having a predetermined pattern is formed.

Next, a contact (which is not described in the figure) provided on the antenna 12 and another contact (which is not described in the figure) provided on the IC chip 13 are electrically connected to each other via an electric conductive material which is made of a conductive paste or solder, and the IC chip 13 is mounted on one side surface of the base substrate 11 (IC chip mounting process).

Next, by the screen printing method, or the like, the magnetic paint including the filler made of the magnetic particulates, the resin, the additive agent, and the solvent is coated on one side surface of the base substrate 11 to such a extent that the antenna 12 and the IC chip 13 are partially covered, or the antenna 12 and the IC chip 13 are completely covered. After the magnetic paint is coated, it is left at room temperature, or is heated at a predetermined temperature for a predetermined time, dried, and hardened, thereby the magnetic substrate layer 15 is formed, and the non-contact type data reception and transmission body 10 is obtained (process for forming the magnetic substrate layer).

In addition, in the present embodiment, although screen printing and etching methods are illustrated as the methods for forming the antenna 12, the present invention is not limited to these. In the present invention, the antenna can be formed by an evaporation method or an ink-jet printing method.

Moreover, in the present embodiment, although the screen printing method is illustrated as the method for forming the magnetic substrate layer 15, the present invention is not limited to this.

In the present invention, the magnetic substrate layer can be formed by an ink-jet printing method, or the like.

Second Embodiment

Figure 2:
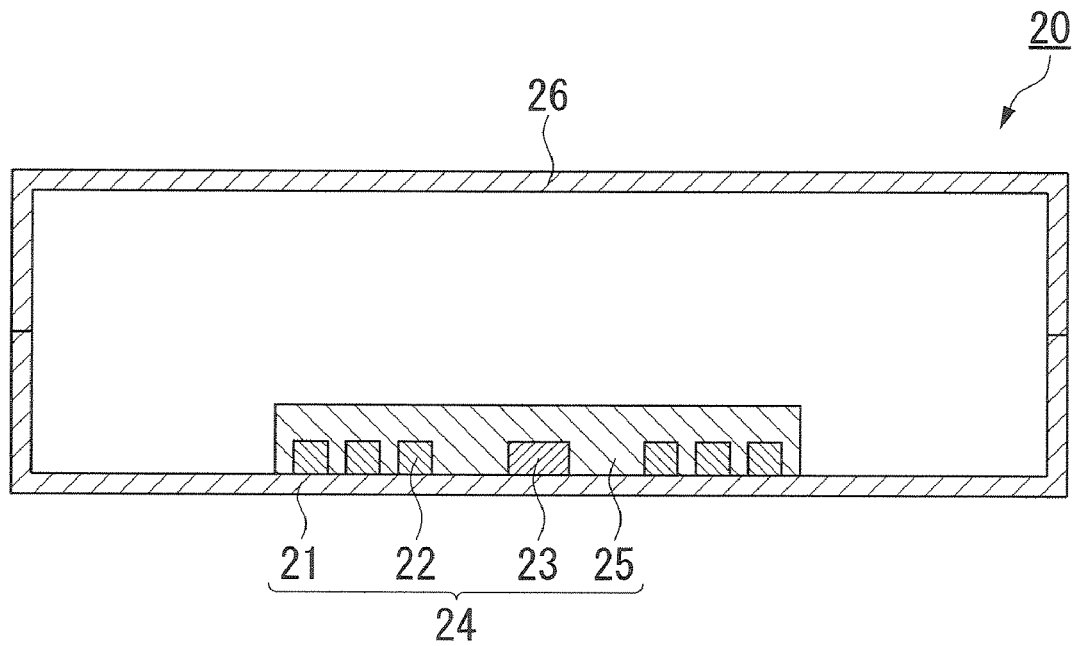
FIG. 2 is a schematic cross-sectional view showing a second embodiment of a non-contact type data reception and transmission body according to the present invention.
Figure 3:
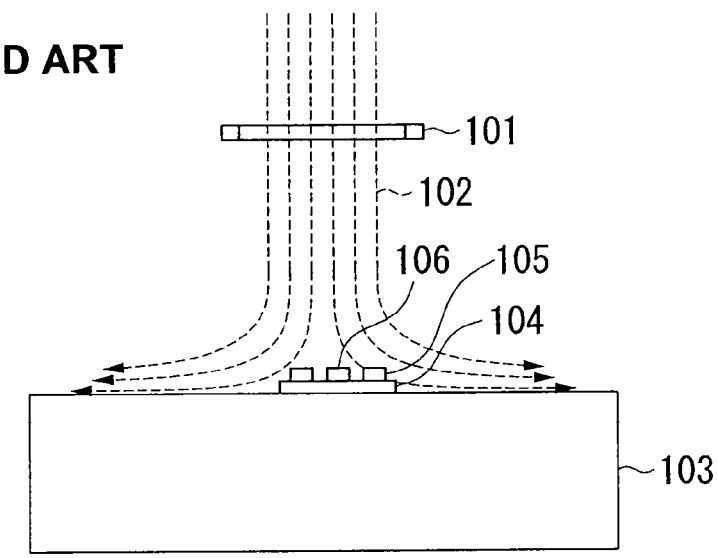
FIG. 3 is a schematic view showing a flow of magnetic flux in the case in which a usual non-contact type data reception and transmission body is disposed on the surface of a metal article.
Figure 4:
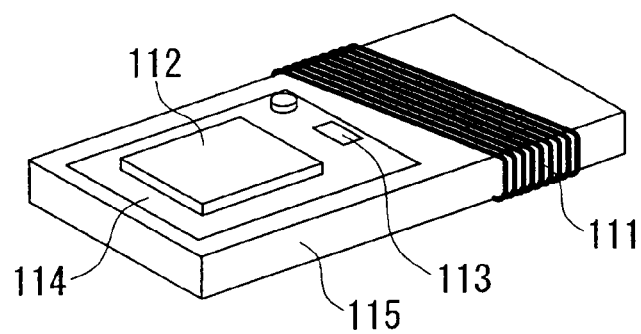
FIG. 4 is a schematic perspective view showing an example of a conventional non-contact type data reception and transmission body.
Figure 5:
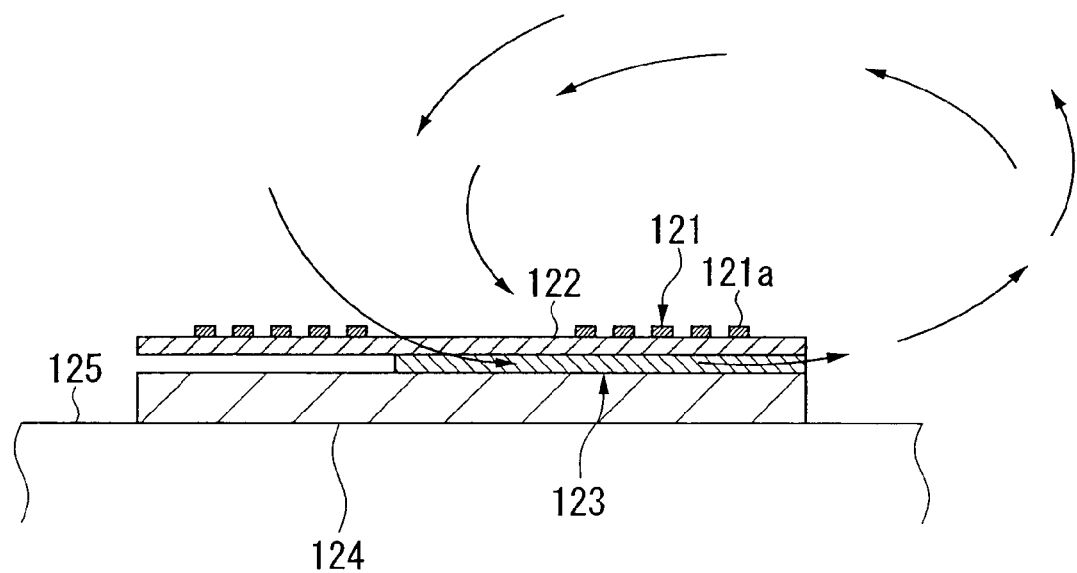
FIG. 5 is a schematic cross-sectional view showing another example of a conventional non-contact type data reception and transmission body.

FIG. 2 is a schematic cross-sectional view showing a second embodiment of a non-contact type data reception and transmission body 20 according to the present invention.

The non-contact type data reception and transmission body 20 according to the present embodiment is schematically provided with a base substrate 21, an inlet 24 having an antenna 22 and IC chip 23 which are connected to each other, a magnetic substrate layer 25 disposed so that the magnetic substrate layer 25 covers the antenna 22 and the IC chip 23, and a protective member 26 connected to the base substrate 21. Moreover, the magnetic substrate layer 25 is composed of a complex in which a filler made of at least magnetic particulates is included in a resin. Furthermore, the inlet 24 is disposed within a closed space in a casing composed of the base substrate 21 and the protective member 26.

According to such a constitution, since the inlet 24 is covered, damage thereto can be prevented.

Hereinafter, although the present invention is explained more specifically with reference to the example, the present invention is not limited to the below-mentioned example.

EXAMPLE

The non-contact type data reception and transmission body as shown in FIG. 1 is manufactured.

In the present example, in the resin solution in which a saturated polyester resin (specific gravity is 1.1, and glass transition temperature is 15° C.) is resolved in cyclohexanone, magnetic paints produced by adjusting the filler content in the magnetic substrate layer to 30% by weight, 50% by weight, 70% by weight, 75% by weight, and 80% by weight are used, a magnetic substrate layer having a thickness of 200 µm is formed in the non-contact type data reception and transmission body having an aluminum antenna size of 20 mm×60 mm, and thereby five kinds of non-contact type data reception and transmission bodies having different amount of filler in the magnetic substrate layer are manufactured.

Regarding the five kinds of non-contact type data reception and transmission bodies obtained, magnetic permeability and communication distance at a frequency of 13.5 MHz are measured.

Measurement of the magnetic permeability is performed by the RF method using impedance analyzer (model: E4991A, manufactured by Agilent Technologies) and test fixture (model: 16454A, manufactured by Agilent Technologies).

Regarding the non-contact type data reception and transmission bodies, tension tests are performed by the method of JIS K7127, and rupture expansion degrees (%) and the degree of fracture growth (%) were measured. In addition, tension speed is set to 50 mm/min.

Measurement of communication distance is performed as follows. The non-contact type data reception and transmission body having an aluminum antenna of 20 mm×60 mm is located on a metal plate of 15 cm in length, 15 cm in width, and 5 mm in thickness. In this state, the non-contact type data reception and transmission body which is in contact with a reading apparatus having an antenna of 61 mm×29 mm is distanced little by little, and the distance at which communication cannot be performed is defined as the communication distance.

Based on these measurement results, the performance is evaluated in three steps of "A", "B", and "C". The standard of evaluation of communication distance is defined as follows.

A: Magnetic permeability is fixed, and is hardly changed, and the communication distance is not less than 50 mm.

B: Magnetic permeability is inferior to that of "A", and although communication can be performed, the communication distance is below 50 mm.

C: Magnetic permeability is low, and communication cannot be performed. The results of evaluation of communication distance are shown in Table 1.

TABLE 1

| FILLER FILLING RATE (% BY WEIGHT) | MAGNETIC PERMEABILITY (13.5 MHz) | RUPTURE EXPANSION DEGREE (%) | RESULT OF EVALUATION OF COMMUNICATION DISTANCE | TOTAL EVALUATION RESULT (COMMUNICATION DISTANCE AND RUPTURE EXPANSION DEGREE ARE CONSIDERED) |
|---|---|---|---|---|
| 30 | 2.53 | 90 | C | C |
| 50 | 5.93 | 50 | B | B |
| 60 | 9.22 | 34 | A | A |
| 70 | 10.8 | 17 | A | A |
| 73 | 10.7 | 15 | A | A |
| 75 | 10.7 | 5 | A | C |
| 80 | 11.8 | 3 | A | C |

In view of the results in Table 1, it is confirmed that, when the amount of filler in the magnetic substrate layer is not less than 50% by weight and less than 60% by weight, because the magnetic permeability is low, although the communication distance is short, communication can be performed. Moreover, it is confirmed that, when the amount of filler in the magnetic substrate layer is not less than 60% by weight, the magnetic permeability and communication distance are almost not dependent on the amount of filler, and the values of the magnetic permeability and the communication distance are almost fixed. Furthermore, in view of the rupture expansion degree, when the amount of filler in the magnetic substrate layer is below 75% by weight, it is confirmed that the magnetic substrate layer has excellent characteristics. In Table 1, the total evaluation results are shown in which the communication distance and the rupture expansion degree are considered. The standard of the total evaluation results is selected from "A": as good as the non-contact type data reception and transmission body, "B": almost as good as the non-contact type data reception and transmission body (that is, although the magnetic substrate layer has excellent characteristics, and communication can be performed, the communication distance is short, and thereby it cannot be said that the non-contact type data reception and transmission body has a sufficient function), and "C": as poor as the non-contact type data reception and transmission body.

INDUSTRIAL APPLICABILITY

The non-contact type data reception and transmission body according to the present invention is not limited to the IC tag built in the space between two substrates, or the like, and the present invention can be applied to a non-contact type data reception and transmission body which is exfoliated form an exfoliation substrate and used.

What is claimed is:

1. A non-contact type data reception and transmission body, comprising:
    an inlet having a base substrate, an antenna and an integrated circuit chip, the antenna and the integrated circuit chip being provided on one surface of the base substrate and being connected to each other, the antenna having a main portion disposed on the one surface of the base substrate without being disposed on a surface opposed to the one surface of the base substrate, the main portion being a portion of the antenna configured to receive or transmit signals; and
    a magnetic substrate layer disposed on an entirety of a top surface of the antenna and disposed on the one surface of the base substrate between adjacent sections of the main portion of the antenna,
    wherein the magnetic substrate layer has a main component of a resin including a filler made of magnetic microparticles, and an amount of the filler in the magnetic substrate layer is not less than 60% by weight and not more than 73% by weight.

2. A non-contact type data reception and transmission body according to claim 1, wherein average particle size of the magnetic microparticles is not less than 3 μm and not more than 200 μm.

3. A non-contact type data reception and transmission body according to claim 1, wherein the magnetic microparticles are flake-shaped.

4. A non-contact type data reception and transmission body according to claim 1, wherein the magnetic microparticles are Fe—Si—Al alloy.

5. A non-contact type data reception and transmission body according to claim 1, wherein the antenna and the integrated circuit chip contact one surface of the base substrate.

6. A non-contact type data reception and transmission body according to claim 1, wherein the antenna is provided in a coil shape with a predetermined interval.

7. A non-contact type data reception and transmission body according to claim 6, wherein the resin of the magnetic substrate layer fills all spaces between the adjacent sections of the main portion of the antenna.

8. A non-contact type data reception and transmission body according to claim 1, wherein the inlet is disposed within a closed casing, the closed casing including the base substrate and a protective member.

9. A non-contact type data reception and transmission body according to claim 1, wherein the magnetic microparticles of the resin overlap with each other.

10. A non-contact type data reception and transmission body according to claim 1, wherein the antenna and the integrated circuit chip are disposed between the magnetic substrate layer and the base substrate.

11. A method of making a non-contact type data reception and transmission body, comprising:
    providing an antenna and an integrated circuit chip on one surface of a base substrate, the antenna having a main portion disposed on the one surface of the base substrate without being disposed on a surface opposed to the one surface of the base substrate, the main portion being a portion of the antenna configured to receive or transmit signals;

connecting the antenna and the integrated circuit chip using an electrically conductive material; and covering the antenna with a magnetic substrate layer such that the magnetic substrate layer is disposed on an entirety of a top surface of the antenna and disposed on the one surface of the base substrate between adjacent sections of the main portion of the antenna, wherein the magnetic substrate layer has a main component of a resin including a filler made of magnetic microparticles, and an amount of the filler in the magnetic substrate layer is not less than 60% by weight and not more than 73% by weight.

12. A non-contact type data reception and transmission body according to claim 1, wherein the top surface of the antenna is a distal surface of the antenna with respect to a portion of the antenna which contacts the one surface of the base substrate.

13. A non-contact type data reception and transmission body according to claim 1, wherein the magnetic substrate layer is disposed on an entirety of a top surface of the integrated circuit chip.

14. A non-contact type data reception and transmission body according to claim 1, wherein the antenna is provided in a coil shape and has a central region, and the adjacent sections of the main portion of the antenna surround the central region of the antenna.

* * * * *